United States Patent [19]

Glorer

[11] Patent Number: 4,975,183

[45] Date of Patent: Dec. 4, 1990

[54] FILTER FOR SEPARATING SOLIDS FROM LIQUIDS

[75] Inventor: Johann Glorer, Rupperswil, Switzerland

[73] Assignee: Zschokke Wartmann A.G., Dottingen, Switzerland

[21] Appl. No.: 22,741

[22] Filed: Mar. 6, 1987

[30] Foreign Application Priority Data

Mar. 11, 1986 [CH] Switzerland ............................ 990/86

[51] Int. Cl.⁵ ............................................. B01D 33/34
[52] U.S. Cl. .................................... 210/107; 210/104; 210/143; 210/413
[58] Field of Search ............... 210/144, 145, 148, 143, 210/413–415, 97, 104, 107, 271

[56] References Cited

U.S. PATENT DOCUMENTS

| 4,081,381 | 3/1978 | Rosenmund et al. | 210/414 |
| 4,376,705 | 3/1983 | Komura et al. | 210/413 |
| 4,592,835 | 6/1986 | Greider et al. | 210/413 |

FOREIGN PATENT DOCUMENTS

| 2454321 | 11/1980 | France | 210/413 |
| 689703 | 10/1979 | U.S.S.R. | 210/413 |

Primary Examiner—Ernest G. Therkorn
Assistant Examiner—Richard D. Jordan
Attorney, Agent, or Firm—Helfgott & Karas

[57] ABSTRACT

A filter used for separating solids from liquids, the filter having a surface on which a filter cake is formed with the solids and being adapted to treat said cake. The filter utilizes a housing; a stirring apparatus disposed within the housing, said apparatus including stirring arms and a first motor for rotating the arms; and at least one second motor for raising and lower the apparatus. The second motor includes a hydraulic cylinder having a piston which is raised and lowered by hydraulic pressure. The piston is connected to the apparatus to raise and lower the apparatus in accordance with the movement of the piston. The cylinder has a first port above the piston and a second port below the piston. The piston is raised when the pressure applied at the second port is higher than that applied at the first port, and is lowered to lower the apparatus when the pressure applied at the first port is higher than that applied at the second port.

9 Claims, 2 Drawing Sheets

FILTER FOR SEPARATING SOLIDS FROM LIQUIDS

BACKGROUND OF THE INVENTION

In filters for separating solids from liquids, particularly nutsch filters, it is known to provide a stirring apparatus above the filter plate which can be used for different purposes. The stirring apparatus essentially comprises a rotary driving shaft which can be raised and lowered. Two or more stirring apparatus arms are secured to the shaft. As a function of the rotation direction and/or the raising or lowering movement, it is possible to perform additional operations.

An important operation to be performed by the stirring apparatus consists of leveling or smoothing the filter cake forming on the filter plate. During the filtering operation, it is unavoidable that the filter cake will build up in a non-uniform manner and cracks can also form. Therefore, the stirring apparatus has the function of leveling or smoothing the filter cake, so that the cracks therein close, in order to ensure a uniform permeability of the filter cake.

For the purpose of leveling the filter cake, it is necessary to exert a given pressure thereon. In addition, this pressure is to be exerted with the same intensity independently of the expansion or shrinkage of the filter cake. In practical operations, particularly when a nutsch filter is used, it is difficult to satisfy the aforementioned requirements. Therefore the nutsch filter operator manually readjusts the smoothing of the filter cake in such a way that despite expansion or shrinkage of the filter cake, the pressure of the stirring apparatus remains approximately constant. However, this manual adjustment of the stirring apparatus is time-consuming, so that the operator is unable to perform other functions having to permanently observe the filtration operations. This can be made more difficult by poor observation possibilities, e.g., due to a fogged or dirty inspection glass.

SUMMARY OF THE INVENTION

The problem of the present invention is to so further develop a filter of the aforementioned type that, during a filtering operation, the function of the stirring apparatus can be left unobserved for a long period and consequently the filter can be integrated into an automatically controlled process sequence.

A filter in accordance with the principles of the invention is employed to separate solids from liquids. The filter has a surface on which a filter cake is formed with the solids and is adapted to treat said cake. The filter has a housing and stirring apparatus disposed within the housing, said apparatus including stirring arms and a first motor for rotating the arms.

At least one second motor is used for imparting linear motion to the apparatus to raise and lower the apparatus. The second motor includes a vertical hydraulic cylinder having a piston which is raised and lowered by hydraulic pressure. The piston is connected to the apparatus to raise and lower the apparatus in accordance with the movement of the piston. The cylinder has a first port above the piston and a second port below the piston. The piston is raised when the pressure applied at the second port is higher than that applied at the first port and is lowered to lower the apparatus when the pressure applied at the first port is higher than that applied at the second port. The piston has a zero rest position at which the apparatus is in a zero rest position when a zero pressure is applied at the both ports. The piston has a leveling position for the apparatus at which, after the apparatus is lowered by pressure control of the piston until the arms engage the cake and the cake exerts a back pressure on the arms, the pressure differentials on the ports are set to hold the apparatus in fixed position as long as the back pressure remains constant. When the cake shrinks, the back pressure decreases and the differential pressure causes the piston to be lowered until the arms again engage the cake and restore the back pressure to the original constant value. When the cake expands, the back pressure increases and the differential pressure causes the piston to be raised until the back pressure is reduced to the original constant value.

The aforementioned objects and advantages of the invention as well as other objects and advantages thereof will either be explained or will become apparent to those skilled in the art when this specification is read in conjunction with the accompanying drawings and specific description of the preferred embodiments which follow.

DETAILED DESCRIPTION OF THE INVENTION

The invention is described hereinafter in connection with a known type of nutsch filter for pressure operation and is diagrammatically shown in FIG. 1. However, the application of the invention is not restricted to a pressure filter and can also be used with open filters and those with vacuum operation.

Figure 1:
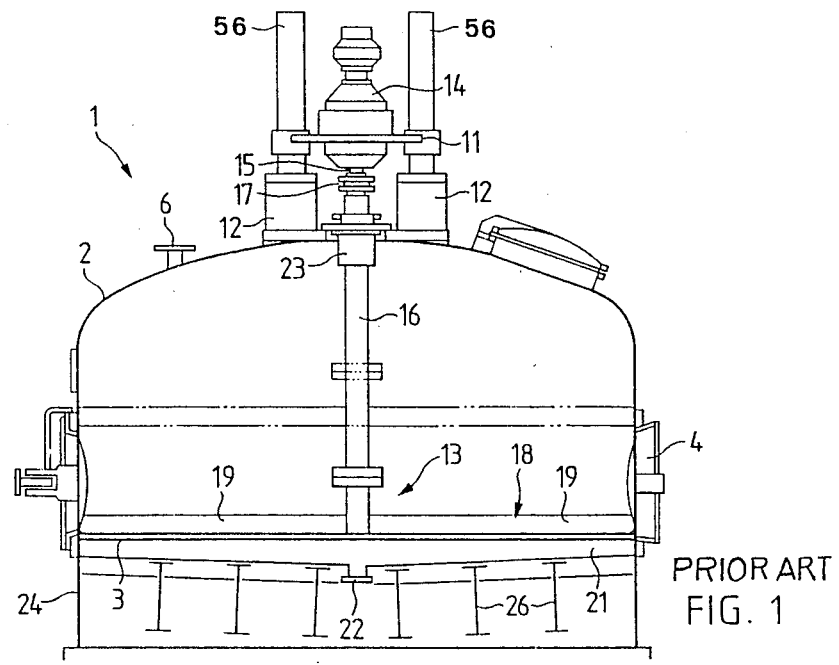
FIG. 1 is a cross-section through a diagrammatically shown nutsch filter.

Nutsch filter 1 in FIG. 1 has a housing 2, which is generally cylindrical and is terminated by a horizontal base 3, which can be detachably or non-detachably connected to housing 2. A closure 4 is provided in the housing wall enabling the filter cake forming in the interior of the housing 2 to be removed. By means of a pipe connection 6 fitted to the cover part of housing 2, it is possible, for example, to introduce into the interior of the housing the slurry or suspension to be filtered. It is also possible to provide a connection (not shown) for introducing a pressure medium e.g. nitrogen or the like.

On base 3 of housing 2 is placed a filter surface, which is covered by a filter material, for example, a filter cloth, a screen or a solid, porous plate.

On the cover part of housing 2 is provided a lifting mechanism, which comprises two linear motors, hydraulic cylinders 8. Linear motors 10 are interconnected by means of a connecting platform 11 and are fixed to base members 12, which are supported on the cover part of housing 2. In addition, the connecting platform 11 is guided by guide columns 56 which encircle the motors 10. On connecting platform 11 is mounted in fixed manner a motor 14, for example, an electric geared motor, to whose driving shaft 15 is coupled by means of a coupling 17, a stirrer shaft 16 of a stirring apparatus 13. To the bottom end of stirrer shaft 16 is fixed a stirrer 18, which has stirring arms 19.

Figure 2:
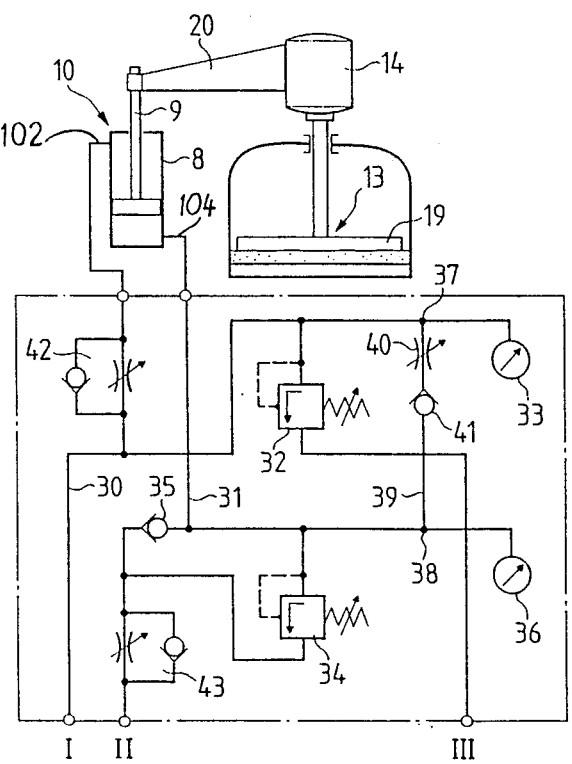
FIG. 2 is a circuit diagram of the control of the linear motor for the raising and lowering movement of the stirring apparatus of a nutsch filter according to FIG. 1.

The two linear motors 10 can be replaced by a single linear motor 10 in the form of hydraulic cylinder 8 in FIG. 2. In this arrangement, the motor 14 for producing the rotary movement of stirring apparatus 13 is connected by means of a projecting support arm 20 to the piston rod of linear motor 10.

Below base 3 is provided a filter drain 21 constructed as a cavity and from which the filtrate can be drained by a discharge tube 22 arranged in the centre. The outer circumference of base 3 is bounded by an annular wall 24 and is supported by webs 26 formed from a double T profile.

Stirring apparatus 13 fulfills different functions depending on the product to be processed and the treatment of the filter cake is particularly important. The filter cake forming on the filter material shrinks if filtrate is removed therefrom. Thus, cracks form in the entire filter cake and can extend up to the filter material. In the pressure operation of a nutsch filter, gas introduced by pressurization can escape through these cracks without having exerted the desired action. As a result of the cracks during washing and drying, the washing fluid or compressed air does not flow uniformly through the filter cake. One of the functions of stirring apparatus 13 is the smoothing or leveling of the filter cake, so that the cracks close and consequently a uniform permeability of the cake is ensured. The filter cake is additionally squeezed out by the pressure exerted thereon by stirring apparatus 13. For leveling the surface of the filter cake, stirring arms 19 are appropriately constructed in slid or runner-like manner.

In order that this leveling of the filter cake can be automatically performed at a constant pressure, the hydraulic control system described in FIG. 2 is provided and linear motor 10 constructed as hydraulic cylinder 8 is subject to the action thereof. Its piston rod 9 supports the platform 11 or support arm 20 carrying the stirring apparatus 13. Cylinder 8 has an upper port 100 above the piston 102 which is connected to a first pipe 30 and has a lower port 104 below the piston which is connected to second pipe 31. A pressure regulating valve 32 is connected to pipe 30 enabling the setting of a constant pressure in said pipe, which can be measured by a pressure gauge 33. A pressure maintaining valve 34 is connected to pipe 31 which, upstream of said valve, maintains the pressure constant independently of the through-flowing quantity. A check valve 35 is provided parallel to pressure maintaining valve 34 in pipe 31 and opens on raising the stirring apparatus 13, but is closed during leveling or smoothing.

With the two valves 32, 34 a constant pressure can be exerted by the stirring apparatus 13 in that on both ports or in pipes 30, 31 a constant pressure is set, so that there is a constant pressure gradient between pipes 30, 31. The pressure exerted by stirring arms 19 during the leveling of the filter cake comprises the pressure exerted by the stirring apparatus weight and the force exerted on the piston rod-side piston surface by the pressure in pipe 30, as well as the oppositely acting forces, which in turn compromise the friction of a stuffing box 23 sealing the stirrer shaft 16, the container pressure acting on the stirrer shaft 16 and the pressure of pipe 31 acting on the piston rod-free piston surface of cylinder 8. For as long as there is only a slight increase in the filter cake thickness, the pressure exerted on the filter cake by the stirring apparatus 13 during the leveling of its surface remains approximately constant. However, if the filter cake becomes markedly thicker, the pressure changes and must be corrected by supplying pressure medium to pipe 31. This adjustment of the pressure can be avoided in simple manner if pipes 30, 31 have branches 37, 38 which are interconnected by a pipe 39 provided with a throttle valve 40 and a check valve 41. Since during the leveling of the filter cake with the stirring apparatus 13 a higher pressure prevails in pipe 30 than in pipe 31, pressure medium flows from pipe 30 into pipe 31. If through the increase in the thickness of the filter cake a back pressure is now exerted on the stirring apparatus, causing piston 102 to rise somewhat, so that pressure medium flows through pipe 39 until the set pressure gradient is again obtained at a higher position of stirring arms 19. Thus, independently of the nature and the formation of the filter cake, the set pressure of the stirring apparatus 13 during leveling remains constant throughout a filter operation.

In the control system according to FIG. 2, a pressure gauge 36 is provided for pipe 31, while in each of the pipes 30, 31 is provided a throttle check valve 42, 43, in which the check valve opens against cylinder 8 in the case of a pressure medium flow. Vibrations which mainly occur in the case of a low dropping speed in the hydraulic system can be counteracted in that the pressure in pipe 31 is reduced to the lowest possible value with the aid of pressure regulating valve 32.

Figure 3:
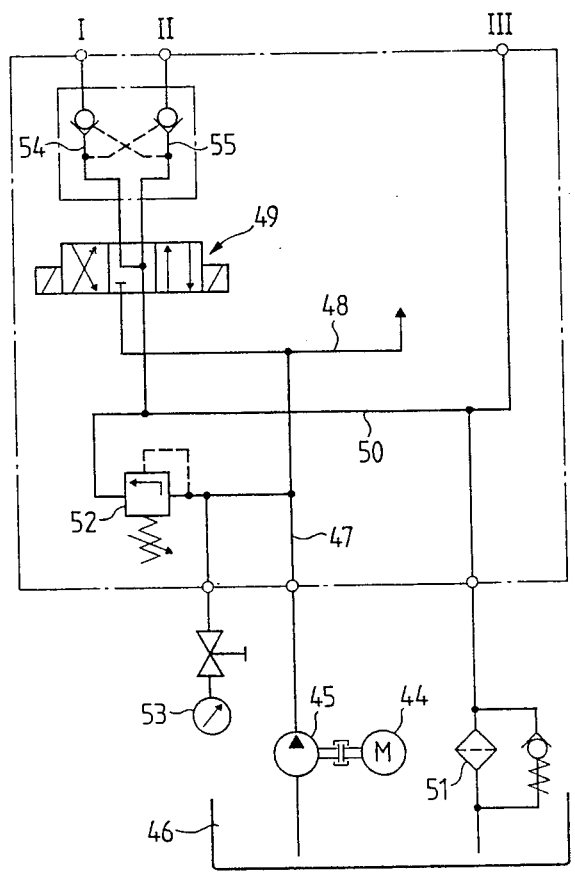
FIG. 3 is a circuit diagram of a pressure source and the associated operating elements for the control system according to FIG. 2.

The complete hydraulic system can be understood from FIGS. 2 and 3. The connecting points are indicated by I, II and III, in which I and II represent the connection of pipes 30, 31 to the pressure network according to FIG. 3. The pressure network is supplied by a hydraulic pump 45 driven by a motor 44, which sucks the pressure medium out of a container 46 and feeds it into a pressure pipe 47, in which a branch 48 can be used for pressurizing other hydraulic units. A 4/3-way valve 49 is connected to pressure pipe 47, pipes 30, 31 being connected to two further connections, while a pressureless return pipe 50 is connected to the fourth connection and issues via a pressure-secured filter 51 into container 46. Into pipe 50 also issue the return pipes from pressure regulating valve 32 (at III) and a pressure regulating valve 52, which is used for regulating the pressure in pressure pipe 47 and which is indicted on a pressure gauge 53. Between the throttle check valves 42, 43 and way valve 49, a pressure-controlled check valve 54, 55 is provided in each of the pipes 30, 31. Valve 54 is opened by the pressure in the feed line of pipe 31 and valve 55 by the pressure in the feed line of pipe 30.

The control system according to FIG. 2 functions as follows.

NUTSCH FILTER STOPPED

When the filter is not operating, the condition is shown in FIGS. 2 and 3. Way valve 49 is manually positioned in the central position, in which pipes 30, 31 are connected to the drain, i.e. to return pipe 50. Therefore also the control lines of check valves 54, 55 are connected to the drain, so that said valves are closed. This means that no pressure medium can flow out and consequently stirring apparatus 13 remains in the set position. The pressure on both ports is zero and both piston and apparatus are in zero position.

RAISING THE STIRRING APPARATUS 13

For this purpose way valve 49 is manually moved into the right-hand position. The pressure network, i.e.

pipe 47 is connected to pipe 31, while pipe 30 is connected to the drain. Thus, stirring apparatus 13 is raised into its upper position by linear motor 10.

STIRRING APPARATUS LEVELING

For this purpose the way valve 49 is moved manually to the left. The pressure set in pressure regulating valve 32 builds up in pipe, while the pressure set by pressure maintaining valve 34 occurs in pipe 31. If the force acting on stirring apparatus 13 are in equilibrium, it remains stationary. The pressure in pipe 30 can now be increased or the pressure in pipe 31 decreased, so that the stirring apparatus 13 moves downwards. If the stirring arms 19 pass onto the filter cake, the downward movement of stirring apparatus 13 is decelerated and consequently a certain force is exerted on the filter cake, so that the rotating stirring apparatus arms smooth the cake surface. If the filter cake shrinks due to the removal of filtrate, the rotating stirring apparatus follows the cake level and presses with the same leveling pressure on the cake surface. If, as a result of the growth of the filter cake, the back pressure on stirring arms 19 increases, the effective weight of the stirring apparatus is reduced, so that by the pressure in pipe 31 and the pressure medium flowing through connecting pipe 39, the stirring apparatus is raised until once again its forces are in equilibrium.

The described leveling means for the stirring apparatus 13 makes it possible to increase the scope of uses of nutsch filters, because the operating expenditure thereof is greatly reduced. The means for achieving this are very simple and can be easily adapted to slurries and suspensions with different solids and solid quantities.

FIGS. 2 and 3 show groups of hydraulic components surrounded by a dot-dash line rectangle. In accordance with FIG. 1, hydraulic cylinder 8 is built up on housing 2, while the components according to FIGS. 2 and 3 can be, e.g., mounted on the pump unit, which normally forms a unit with the container, the drive motor and further components. The valves and throttles are shown as being regulatable by an arrow in FIGS. 2 and 3. However, it is a function of the use conditions of the nutsch filter as to whether the valves have a fixed setting or remain adjustable.

While the fundamental novel features of the invention have be shown and described and pointed out, it will be understood that various substitutions and changes in the form of the details of the embodiments shown may be made by those skilled in the art without departing from the concepts of the invention as limited only by the scope of the claims which follow.

I claim:

1. A filter for separating solids from liquids, the filter having a surface on which a filter cake is formed with the solids being adapted to treat said cake, said filter comprising:
   a housing;
   stirring apparatus disposed within the housing, said apparatus including stirring arms and a first motor for rotating the arms;
   means automatically responsive to filter cake formation that includes at least one second motor for imparting linear motion to the apparatus to raise and lower the apparatus, said second motor includes a vertical hydraulic cylinder having a piston which is raised and lowered by hydraulic pressure, the piston being connected to the apparatus to raise and lower the apparatus in accordance with the movement of the piston, the cylinder having a first port above the piston and a second port below the piston, the piston being regulated by a first pressure control means is raised when the pressure applied at the second port is higher than that applied at the first port, the piston being regulated by a second pressure control means is lowered to lower the apparatus when the pressure applied at the first port is higher than that applied at the second port, the piston having a zero rest position at which the apparatus is in a zero rest position when a zero pressure is applied at the both ports, the piston having a leveling position for the apparatus at which after the apparatus is lowered by regulation of the second pressure control means until the arm engages the cake and the cake exerts a back pressure on the arms the pressure differentials on the ports are set to hold the apparatus in fixed position as long as the back pressure remains constant, so that, when the cake shrinks, the back pressure decreases and the second pressure control means causes the piston to be lowered until the arms again engage the cake and restore the back pressure to the original constant value and when the cake expands, the back pressure increases and the first pressure control means causes the piston to be raised until the back pressure is reduced to the original constant value.

2. The filter of claim 1 further including means for manually establishing such pressures on the ports as to selectively
   (a) place the piston in zero position; or
   (b) lower the piston; or
   (c) raise the piston; or
   (d) establish a leveling position for the piston.

3. The filter of claim 2 wherein the piston of the second motor is mechanically connected to the apparatus.

4. The filter of claim 3, wherein the piston is subject to action of the pressure medium of a pressure source, wherein for the lifting movement of the stirring apparatus one port is subject to the constant pressure of the pressure medium regulated by a pressure regulating valve via a first pipe, while for setting the pressure on the other port, said other port is connected to a second pipe having a pressure maintaining valve.

5. The filter according to claim 4, wherein a branch is provided in the first pipe between said one port and the pressure regulating valve, was well as in the second pipe between the other port and the pressure maintaining valve, said branches being interconnected by a connecting pipe provided with an adjustable throttle means.

6. The filter according to claim 5, wherein in the connecting pipe a check valve is arranged in series with the throttle means, which blocks the passage of the pressure medium from the second pipe to the first pipe.

7. A filter according to claim 6, wherein a throttle check valve is arranged in each of the first and second pipes, the check valve opening in the case of a pressure medium flow directed against the second motor.

8. A filter according to claim 7, wherein in the first or second pipe is fitted a check valve controlled by the pressure of the second or first pipe and prevents the emptying of the first and second pipe when no pressure medium flows in.

9. A filter according to claim 8, wherein a check valve is connected in parallel to the pressure maintaining valve and opens in the case of a pressure medium flow direct against the linear motor.

* * * * *